United States Patent [19]

Kosaka

[11] Patent Number: 5,134,190
[45] Date of Patent: Jul. 28, 1992

[54] POLYARYLENE SULFIDE RESIN COMPOSITIONS AND MOLDED ARTICLES

[75] Inventor: Wataru Kosaka, Ichihara, Japan

[73] Assignee: Idemitsu Petrochemical Company Limited, Tokyo, Japan

[21] Appl. No.: 482,581

[22] Filed: Feb. 21, 1990

[30] Foreign Application Priority Data

Feb. 22, 1989 [JP] Japan .................................. 1-42629

[51] Int. Cl.$^5$ ............................................. C08L 81/00
[52] U.S. Cl. .................................... 524/609; 523/220;
524/493; 524/444; 524/609
[58] Field of Search ................ 523/220; 524/609, 493, 524/444

[56] References Cited

U.S. PATENT DOCUMENTS

| 4,365,037 | 12/1982 | Adachi et al. | 524/449 |
| 4,885,321 | 12/1989 | Nitoh et al. | 523/219 |

FOREIGN PATENT DOCUMENTS

| 0229495 | 7/1987 | European Pat. Off. . |
| 0272839 | 6/1988 | European Pat. Off. . |
| 0340954 | 11/1989 | European Pat. Off. . |
| 59-54290 | 3/1984 | Japan . |
| 60-23462 | 2/1985 | Japan . |
| 62-142786 | 6/1987 | Japan . |
| 62-270659 | 11/1987 | Japan . |
| 63-354 | 1/1988 | Japan . |

OTHER PUBLICATIONS

Patent Abstracts of Japan, vol. 12, No. 198, Jun. 8, 1988, JP A 63 000 354.
Patent Abstracts of Japan, vol. 8, No. 93, Apr. 27, 1984, JP A 59 011 359.
Patent Abstracts of Japan, vol. 13, No. 419, Sep. 18, 1989, JP A 1 158 072.
Patent Abstracts of Japan, vol. 13, No. 224, May 24, 1989, JP A 1 036 650.

Primary Examiner—Melvyn I. Marquis
Assistant Examiner—Helen F. Lee
Attorney, Agent, or Firm—Nikaido, Marmelstein, Murray & Oram

[57] ABSTRACT

A polyarylene sulfide resin composition contains 30% to 75% by weight of a polyarylene sulfide resin (A), 15% to 70% by weight of a fiber reinforcement (B) containing silic acid as a major component and having an average fiber diameter of 15 μm or shorter and an average fiber length of 300 μm or longer, and 1% to 25% by weight of a fiber reinforcement (C) containing $Al_2O_3$ and $SiO_2$ as major components in a ratio in weight of $Al_2O_3$ to $SiO_2$ ranging from 0.8 to 1 to 1.3 to 1 and having an average fiber diameter of 7 μm or shorter and an average fiber length of 150 μm or shorter. The composition is remarkable as molding material and a molded article resulting from the composition offers excellent mechanical strength and characteristics for metal plating. The metal-plated, molded article from the composition is particularly excellent in platability such as plate adhesion and plate gloss as well as short etching time.

11 Claims, No Drawings

POLYARYLENE SULFIDE RESIN COMPOSITIONS AND MOLDED ARTICLES

BACKGROUND OF THE INVENTION

1. Field of the Invention

The present invention relates to a novel polyarylene sulfide composition and a molded article prepared from the same. More particularly, the present invention relates to the novel polyarylene sulfide composition which is excellent in platability, including good adhesion and gloss of the plated material as well as short etching time, and which can provide molded articles with high mechanical strength, and to the molded article prepared from the polyarylene sulfide composition.

2. Description of Related Art

Recently, polyarylene sulfides have drawn greater attention as engineering plastics having excellent heat stability, chemical resistance, electric insolubility and so on, than engineering plastics such as polycarbonates, polyamides, polyacetals, polyethylene terephthalates, modified polyphenylene ethers, polysulfones, and polyether sulfones.

Such polyarylene sulfides, however, are so poor in ductility and are so brittle that they are not good for use as industrially functional parts, if they are used singly. Thus, they have recently been used in combination with fiber reinforcement such as glass fibers, thereby yielding fiber-reinforced polyarylene sulfides with significantly improved mechanical strength, toughness, heat distortion resistance and so on, which in turn lend themselves to various electronic equipment parts, electrical equipment parts for vehicles, and so on.

The fiber-reinforced polyarylene sulfides are thermoplastic resins as well as have the foregoing characteristics so that, unlike thermosetting resins such as epoxy resins, they are injection-moldable and mass-producible, they do not require fabrication, such as forming through-holes and so on, and they are integrally moldable to form integral articles such as board-casing or board-connecter intergral parts. Due to those advantages, they recently expanded their use to electronic parts, such as printed circuit boards, and housings for preventing EMI (Electro Magnetic Interference).

When the polyarylene sulfides are intended to be used for the above-mentioned use, there is required remarkable platability, such as excellent plate adhesion and plate gloss and a short etching time as well. As the polyarylenesulfides do not have a phase-separate structure, unlike ABS or the like, it is required that plate adhesion be improved by means of the anchoring effect by etching of a filler. The polyarylene sulfides themselves, however, have excellent chemical resistance so that the composition of an etching solution may be subject to restriction to a considerable extent.

In order to improve platability of the polyarylene sulfide resin compositions, various attempts have so far been made. For instance, (1) Japanese Patent Unexamined Publication (kokai) No. 54,290/1984 discloses a metal-plated article consisting of glass fiber-reinforced polyarylene sulfide and having adhesion (peel strength) of ca. 1.5 kg/cm. (2) Japanese Patent Unexamined Publication (kokai) No. 23,462/1985 discloses a method for improving plate gloss by etching a polyarylene sulfide only with a good solvent for the polyarylene sulfide using a filler in controlled shapes. (3) Japanese Patent Unexamined Publication (kokai) No. 270,659/1987 discloses a method for improving peel strength and gloss of appearance and shortening etching time by formulating a glass-fiber reinforced composition with potassium titanate whiskers.

The method as disclosed in item (1) above, however, requires a longer etching time and cannot improve gloss on a plate surface when only glass fibers are used. The method as disclosed in item (2) above requires a unique good solvent for the polyarylene sulfide, such as $\alpha$-chloronaphthalene or the like. Such a solvent, however, is highly poisonous and treatment should be at extremely high temperatures so that a great amount of volatiles are generated, thereby polluting working circumstances and incurring the risk of fire and a burn. Thus this method cannot be said to be practical. The method as disclosed in item (3) above presents drawbacks in that it uses expensive potassium titanate whiskers, it cannot control its composition, and it incurs the risk of reducing mechanical strength.

Further, Japanese Patent Unexamined Publication (kokai) No. 354/1988 proposes a resin composition containing 20–80% by weight of polyarylene sulfide and 10–75% by weight of short fibers consisting mainly of silicic acid, having a diameter of 13 $\mu$m or shorter and and average length of 150 $\mu$m or shorter. The resin composition cannot be said to be sufficient in mechanical strength and platability. Japanese Patent Unexamined Publication (kokai) No. 142,786/1987 proposes a method for treating an article molded from a polyphenylene sulfide resin composition containing glass fibers or a mixture of glass fibers with an inorganic filler with a hydrofluorate solution containing hydrofluoric acid. The method does not provide the molded article having a sufficient degree of mechanical strength and platability.

SUMMARY OF THE INVENTION

The present invention can overcome the foregoing drawbacks prevailing in the conventional polyarylene sulfide resin compositions and has the object to provide the polyarylene sulfide resin compositions which can offer excellent platability in terms of remarkable plate adhesion and plate gloss as well as short etching time and which further provide molded article having high mechanical strength. The present invention has another object to provide molded articles with the foregoing characteristics.

As a result of extensive research, it now has been found that an addition to a polyarylene sulfide resin of a combination of a particular amount of fiber reinforcement in a particular shape, containing silicic acid as a major component, with a particular amount of fiber reinforcement in a particular shape, containing $Al_2O_3$ and $SiO_2$ as major components, can achieve the objects of the present invention.

In order to achieve the objects, one aspect of the present invention consists of a polyarylene sulfide resin composition comprising (A) from 30% to 75% by weight of a polyarylene sulfide resin; (B) from 15% to 70% by weight of at least one kind of fiber reinforcement containing silicic acid as a major component and having an average fiber diameter of 15 $\mu$m or shorter and an average fiber length of 300 $\mu$m or longer; and (C) from 1% to 25% by weight of at least one kind of fiber reinforcement containing $Al_2O_3$ and $SiO_2$ as major components and having an $Al_2O_3$-to-$SiO_2$ ratio (in weight) ranging from 0.8-to-1 to 1.3-to-1 and an average fiber diameter of 7 μm or shorter and an average fiber length of 150 μm or shorter.

In another aspect, the present invention consists of a molded article and a plated, molded article, which are obtained from the polyarylene sulfide resin composition.

DESCRIPTION OF THE PREFERRED EMBODIMENTS

The polyarylene sulfide resin (A) to be used for the present invention may include one containing usually 70% by mole or greater, preferably 90% by mole or greater, of a repeating unit represented by general formula (I):

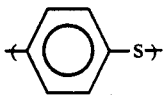

If the repeating unit (I) is less than the lower limit, heat resistance may be impaired so that such a resin is not preferred.

The polyarylene sulfide resin (A) may contain other units as follows:

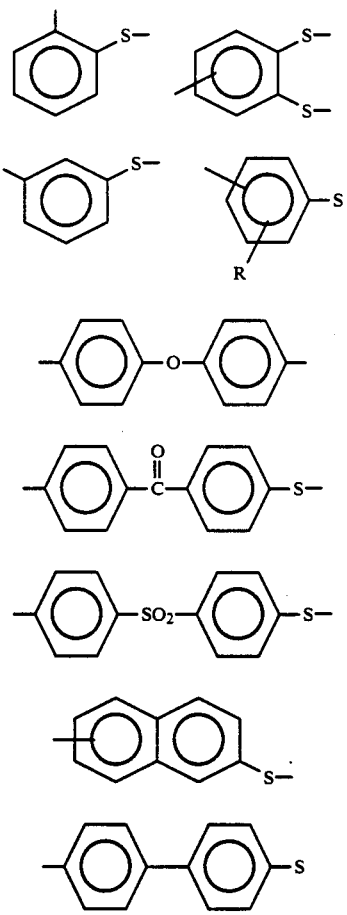

(wherein R is an alkyl group, a phenyl group, a nitro group, a carboxyl group, nitrile group, an amino group, an alkoxy group, hydroxyl group or a sulfone group).

In addition to the repeating unit (I), these units may be contained singly or in combination of two or more in an amount usually of 30% by mole or lower, preferably 10% by mole or lower.

The polyarylene sulfide resin may be prepared in various processes. As usual preparation processes, there are known, for example, (1) a process for preparing a polymer having a relatively small molecular weight, as disclosed in Japanese Patent Examined Publication (kokoku) No. 3,368/1970) and (2) a process for preparing a substantially linear polymer having a comparatively high molecular weight, as disclosed in Japanese Patent Examined Publication No. 12,240/1977. The low-molecular polymer obtainable by the process (1) above can be converted into a polymer having a higher molecular weight by heating the low-molecular polymer in an oxygen atmosphere or in the presence of a crosslinking agent such as a peroxide. Although any polyarylene sulfide resin obtainable by any process can be used for the present invention, it is preferred to use the substantially linear polymer with a relatively high molecular weight prepared by the process (2) above from the viewpoint of polymer performance.

Although a melt viscosity of the polyarylene sulfide resin (A) is not restricted to a particular one as long as it can provide desired moldings, it is preferred from the viewpoint of moldability and rigidity to use the resin having the melt viscosity ranging usually from 500 to 10,000 poises, preferably from 1,000 to 6,000 poises, when measured at 300° C. and 100 sec$^{-1}$ with a capillary tube viscometer.

As the fiber reinforcement (B) may be used one containing silicic acid as a major component and having an average fiber diameter of 15 μm or shorter, preferably 13 μm or shorter, and an average fiber length of 300 μm or longer, preferably 400 μm or longer. Although it is preferred to use the fiber reinforcement with a shorter fiber length, it may impair mechanical strength of the resulting composition if the fiber length is too short. If the shape of the fiber reinforcement (B) is beyond the foregoing scope, the resulting composition cannot significantly satisfy requirements for mechanical strength and plate adhesion.

The fiber reinforcement (B) may include, for example, glass fibers, a portion of ceramic fibers, and so on. It may be used in a form of roving, chopped strand, milled fiber or the like. Among these, fibers having an average fiber diameter of 3 to 13 μm is preferred. The fiber reinforcement (B) may be used singly or in combination with two or more.

The fiber reinforcement (C) may be one containing $Al_2O_3$ and $SiO_2$ as major components and having an average fiber diameter of 7 μm or shorter, preferably 5 μm or shorter, and an average fiber length of 150 μm or shorter, preferably 100 μm or shorter. If its average fiber diameter is longer than the upper limit or its average fiber length is longer than the upper limit, the number of the filler in the composition is too low that plate adhesion and plate gloss may be reduced.

Although it is difficult to prepare such a fine fiber reinforcement from a usual E-glass ($SiO_2:Al_2O_3=54:14$ (by weight)); such a fiber reinforcement can be readily prepared if the $Al_2O_3$ content would be made greater than that of the E-glass because an increase in the $Al_2O_3$ content makes its viscosity lower. If the amount of the $Al_2O_3$ is too large, etching becomes unlikely to be implemented with a usual etching solution ($HNO_3/NH_4HF_3$ type) due to a high chemical resistance of $Al_2O_3$ and a transition to a crystalline state from a glass state. A ratio in weight of $Al_2O_3$ to $SiO_2$ of the fiber reinforcement (C) may range from 0.8 to 1 to 1.3 to 1, preferably from 0.85 to 1 to 1.2 to 1.

The fiber reinforcement (C) may include, for example, various milled ceramic fibers, preferably having an average fiber diameter of 2 to 4 μm and an average fiber length of 10 to 30 μm. The fiber reinforcement (C) may be used singly or in combination of two or more.

The amount of the polyarylene sulfide resin (A) in the composition according to the present invention may range from 30% to 75% by weight, preferably from 35% to 70% by weight, more preferably from 40% to 65% by weight. The amount of the fiber reinforcement (B) in the composition may range from 15% to 70% by weight, preferably from 17% to 68% by weight, more preferably from 18% to 65% by weight. The fiber reinforcement (C) may be used in an amount ranging from 1% to 25% by weight, preferably from 1.2% to 23% by weight, more preferably from 2% to 20% by weight. If the amounts of the components are beyond their limits, it is difficult to provide the resin composition which can satisfy requirements for platability and mechanical strength. Thus such resin compositions cannot achieve the objects of the present invention.

In accordance with the present invention, the fiber reinforcements (B) and (C) may be used as they are or as they were previously surface-treated with a conventional surface-treating agent such as, for example, a silane type coupling agent, a titanate type coupling agent, an aluminate coupling agent or the like. The surface-treating agent may be added upon preparation of the resin compositions.

The silane type and titanate type coupling agents are preferred. The silane type coupling agent may include, for example, triethoxysilane, vinyltris(β-methoxyethoxy)silane, γ-methacryloxypropyltrimethoxysilane, γ-glycidoxypropyltrimethoxysilane, β-(3,4-epoxycyclohexyl)ethyltrimethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-N-phenyl-γ-aminopropyltrimethoxysilane, γ-mercaptopropyltrimethoxysilane, γ-chloropropyltrimethoxysilane or the like. Preferred are γ-aminopropyltriethoxysilane and N-β-(aminoethyl)- γ-aminopropyltrimethoxysilane.

The titanate type coupling agent may include, for example, isopropyltriisostearoyl titanate, isopropyltridodecylbenzenesulfonyl titanate, isopropyltris(dioctylpyrophosphate)titanate, tetraisopropylbis(dioctylphosphite) titanate, tetraoctylbis(ditridecylphosphite) titanate, tetra(2,2-diallyloxymethyl-1-butyl)bis(ditridecyl)phosphite titanate, bis(dioctylpyrophosphate)oxyacetate titanate, bis(dioctylpyrophosphate)ethylene titanate, isopropyltrioctanoyl titanate, isopropyl dimethacrylisostearoyl titanate, isopropylisostearoyldiacryl titanate, isopropyltri(dioctylphosphate) titanate, isopropyltricumylphenyl titanate, isoproyltri(N-amidoethyl-aminoethyl)titanate, dicumylphenyloxyacetate titanate, diisostearoylethylene titanate or the like. Among those coupling agents, isopropyltriisostearoyl titanate and isopropyltri(N-amidoethylaminoethyl) titanate are preferred.

The resin composition according to the present invention may optionally contain a filler as long as the filler does not impair or impede the objects of the present invention. The filler may be in a form of powders, granules, plates or fibers. The filler may include, for example, an oxide such as silica, diatomaceous earth, barium ferrite, beryllium oxide, pumice or pumice balloon, a hydroxide such as aluminium hydroxide, magnesium hydroxide, basic magnesium carbonate or the like, a carbonate such as calcium carbonate, magnesium carbonate, dolomite, dawsonite or the like, a sulfate or sulfite such as calcium sulfate, barium sulfate, barium sulfate, ammonium sulfate, calcium sulfite or the like, a silicate such as talc, clay, mica, asbestos, glass balloon, glass beads, calcium silicate, montmorillonite, bentonite or the like, a carbon such as carbon black, graphite, carbon fibers, carbon hollow beads or the like, an inorganic filler such as molybdenum sulfide, boron fibers, zinc borate, barium metaborate, calcium borate, sodium borate or the like, a metal element or a metal oxide thereof, such as zinc, copper, iron, lead, aluminium, nickel, chromium, titanium, manganese, tin, platinum, tungsten, gold, magnesium, cobalt, strontium or the like, an alloy such as stainless steel, solder, brass or the like, and a metal type ceramic such as silicon carbide, silicon nitride, zirconia, aluminium nitride, titanium carbide or the like. These fillers may be used in a form of powders, whiskers, granules or the like. Furthermore, the filler may be a metal type filler including, for example, metal fibers such as single metal fibers or alloy fibers, e.g., aluminium fibers, stainless steel fibers, copper fibers, brass fibers, nickel fibers, silicon carbide fibers, single-crystal potassium titanate or the like, or metal whiskers thereof. The resin composition according to the present invention may optionally contain a variety of additives which have been used for conventional polyarylene sulfide resin compositions in a range that does not impair or impede the objects of the present invention. The additives may include, for example, antioxidant, thermal stabilizer, lubricant, nucleator, ultraviolet absorber, colorant, processing improver or the like. It may further contain various resins other than the polyarylene sulfide resin, such as fluorine resin, polyamide, polycarbonate, polysulfone, polyarylsulfone, polyether sulfone, polyimide, polyamidoimide, epoxy resin, polyethylene, polypropylene, polyolefin modified with an unsaturated carboxylic acid or its derivative, polyethylene terephthalate, polybutylene terephthalate or the like.

The process for the preparation of the resin composition according to the present invention is not restricted to a particular one and may comprise kneading the polyarylene sulfide resin (A), fiber reinforcements (B) and (C) and, as desired, the filler and the additive in a molten state at a temperature above the melting point of the polyarylene sulfide resin, with a monoaxial screw extruder or a biaxial screw extruder and then pelletizing the resulting mixture.

The polyarylene sulfide resin composition prepared hereinabove may be molded by any molding process such as, for example, injection molding, compression molding, extrusion molding or the like. The molding temperature may be preferably one that is higher than the melting point of the resin and it is further preferred to use a mold at a temperature (equal to or higher than 130° C.) which proceeds with crystallization of the resin because the peeling strength can be improved although the etching time may be extended to some extent. It is also possible to subject the molded article to heat treatment, thereby increasing crystallinity particularly on the surface of the molded article.

It should be noted that a surface of the mold which comes into contact with the surface of the resulting molded article is not coated with a lubricant, particularly with a silicone lubricant, during molding. The use of the lubricant may reduce adhesion due to a so-called skipping phenomenon caused by poor etching if it cannot be removed thoroughly by washing in the pre-treatment of the plate.

The process of plating the molded article of the polyarylene sulfide resin composition is not restricted to a particular one and there may be used a conventional plating process comprising, for example, a series of (1) pre-treating step, (2) etching step, (3) electroless plating step (chemical plating) and (4) electroplating step.

In the pre-treating step (1), the molded article is subjected to degreasing treatment, for example, with an aqueous solution of a surfactant or an organic solvent such as acetone, alcohol, trichloroethane or the like, after the surface of the molded article has been thermally treated to remove its internal strain. Then, the surface of the molded article may be roughened with sand blast in order to improve plate adhesion. It is to be noted, however, that the roughening treatment may be omitted when good surface finish is to be performed because this treatment may impair appearance and when operation is rendered laborious due to a shape of the molded article.

In the etching step (2), the pre-treated molded article is subjected to etching with an etching solution. As the etching solution, there may be used a mixed solution of a chromic acid compound, sulfuric acid and phosphoric acid, a mixed solution of a hydrofluorate, a mineral acid and a hydrofluoric acid, or the like. The etching temperature may range usually from ambient temperature to 70° C., and the etching time may range from 1 to 30 minutes.

The electroless plating (chemical plating) step may comprise a first treatment for providing sensitiveness, a second treatment for providing activation, and a third treatment for chemical plating. The first treatment comprises adsorbing a reducible metal salt such as stannous chloride on the surface of the molded article. The second treatment comprises precipitating a catalyzable noble metal such as palladium, gold, silver, rhodium or the like out from a treating solution and adsorbing it on the surface of the molded article through the reducible metal salt previously adsorbed on the surface thereof. The surface of the molded article is then subjected to chemical plating such as chemical copper plating or chemical nickel plating.

The electroplating step involves subjecting the conductive surface of the molded article treated by the third treatment to electroplating treatment in conventional manner, thereby providing the molded article of the polyarylene sulfide resin composition on which the metal plating is effected in desired manner.

The polyarylene sulfide resin composition according to the present invention may appropriately be used as various molding material because it can provide the molded article which is remarkable in mechanical strength, toughness, heat distortion resistance, chemical resistance or the like as well as excellent in platability such as good plate adhesion and plate gloss and short etching time.

The present invention will be described in more detail by way of examples, but it should be noted that the examples are given merely by illustration, not by limitation.

Physical properties of the molded article according to the present invention are measured and evaluated in the way as will be described hereinafter.

(1) Plate adhesion (peeling strength):

A plated surface was cut in lines parallel to each other in a 1 cm width and the cut plate layer was pulled in the direction perpendicular to the plated surface at the rate of 100 mm/min. The peeling strength is represented as the minimum value required for peeling the plate layer off.

(2) Plate appearance:

The appearance on the plate surface was visibly observed apart by 60 cm from the plate surface under the lightening with a light source of 150 lux or greater. The plate appearance is rated as follows:

⊚—Extremely good in smoothness
○—Good
△—Slightly poor
×—Poor (3) Bending strength:

The bending strength was measured in accordance with ASTM D-790 at the bending rate of 2.0 mm/min using a test specimen having a thickness of 3.2 mm (⅛ inch) and a span of 50 mm.

PREPARATION EXAMPLE 1

Preparation of Polyphenylene Sulfide $Na_2S.5H_2O$ (120 kg), 102 kg of p-dichlorobenzene and 30 kg of lithium chloride were poured into 340 liters of N-methylpyrrolidone and the mixture was reacted at 250° C. for 4 hours after dehydration by heating, thereby yielding polyphenylene sulfide. The resulting polyphenylene sulfide was collected, washed with water and then with acetone, and dried at 120° C. for 24 hours, thereby yielding white, granular polyphenylene sulfide in the amount of 66 kg (yield, 87%).

The resulting product was found to have a melt viscosity of 2,000 poises, as measured at 300° C. and 100 $sec^{-1}$ with a capillary tube viscometer, and a melting point (Tm) of 285° C.

EXAMPLES 1-9 AND COMPARATIVE EXAMPLES 1-10

The polyphenylene sulfide (PPS) prepared in Preparation Example 1 was blended in dry state with fiber reinforcements as shown in Table 1 below in amounts as shown in Table 2 below. The resulting blend was then kneaded with 20-mmφ monoaxis extruder at the resin temperature of 320° C. to 330° C. and then pelletized.

The resulting pellets were molded with a molding machine (Model: IS-30EPN; Toshiba Kikai K.K.) at the mold surface temperature of 150° C. into 40×80×3 $mm^t$ flat plates for plating and into 127×12.7×3.2 $mm^t$ plates in a strip form for testing bending strength (ASTM D-790).

The plating was effected in accordance with TSO standard PPS plating conditions (Okuno Seiyaku Kogyo K.K.). The flat plate was subjected to degreasing treatment at 55° C. for 5 minutes with a phosphate type solution ("ACE A-220") in the concentration of 50 grams per liter, washed with water and dried. Then the plate was subjected to etching at 40° C. for 10 minutes with an etching solution (a mixture of 1,000 ml of 62% by weight of $HNO_3$ with 150 grams of $NH_4F.HF$), washed with water and subjected to conditioning treatment at 40° C. for 5 minutes using a solution ("Condilyzer SP") in the concentration of 150 ml per liter.

After the plate was washed with water, the surface-treated flat plate was then treated at room temperature for 2 minutes using OPC-SALM in the concentration of 260 grams per liter and then at room temperature for 5 minutes with 40 ml of OPC-80 Catalyst M and a solution of OPC-SALM in the concentration of 250 grams per liter. Then the plate was washed with water and treated at 40° C. for 4 minutes with an OPC-500 accelerator M solution (H-1, 120 ml/liter; H-2, 20 ml/liter), followed by washing with water.

The flat plate was then subjected to electroless plating at 20° C. for 15 minutes using an OPC-700 electroless copper plating M solution (A, 100 ml/liter; B, 100 ml/liter; C, 2 ml/liter) and washed with water. Thereafter, the plate was treated for activation at room temperature for 30 seconds using a solution of Topsan in the concentration of 75 grams per liter and then washed with water. The electroplating was then effected on the flat plate at room temperature using a copper sulfate plating bath for providing a gloss on the plate surface. The solutions used were commercially available from Okuno Seiyaku Kogyo K.K.

The plate adhesion (peeling strength) of the metal plate on the molded article was given in the manner as described hereinabove and appearance was visibly observed in the manner as described hereinabove. The bending strength was also measured with the plates in the strip form in the manner as described hereinabove. The test results are shown in Table 2 below.

As have been described hereinabove, the present invention provides the polyarylene sulfide resin composition comprising the polyarylene sulfide resin and the particular amounts of the two types of the fiber reinforcements, thereby offering remarkably improved platability performance, such as excellent plate adhesion and plate gloss and short etching time, as well as mechanical strength, toughness, heat distortion resistance and so on, to the resulting molded articles. The resin composition according to the present invention is suitable for various molding materials and the molded articles, particularly the molded articles on which a metal plate was formed, possess the characteristics as described hereinabove so that they can appropriately be used for parts in the electronic field, such as printed circuit boards, housings for shielding electromagnetic waves, and so on, and as reflective mirrors.

TABLE 1

| Ref. Nos. | Kinds of Fibers | Product Nos. | First Major Component | Second Major Component | Average Fiber Length ($\mu m$) | Average Fiber Diameter ($\mu m$) | Manufacturers |
|---|---|---|---|---|---|---|---|
| G-1 | Chopped GF | ECSO3T717 | $SiO_2$ | $Al_2O_3$ | 3000 | 13 | Nippon Denki Glass K.K. |
| G-2 | " | ECSO15T717DE | " | " | 1500 | 6 | Nippon Denki Glass K.K. |
| G-3 | Milled GF | FESS-010-1230 | " | " | 240 | 10 | Fuji Fiber Glass K.K. |
| G-4 | " | FESS-015-1230 | " | " | 450 | " | Fuji Fiber Glass K.K. |
| G-5 | " | EPG140M-10A | " | " | 140 | 9 | Nippon Denki Glass K.K. |
| G-6 | " | EPG70M-10A | " | " | 70 | " | Nippon Denki Glass K.K. |
| C-1 | Ceramic Fiber Chopped[*1] | Fiber flux chopped fiber | " | " | 530 | 3.4 | Toshiba Monoflux K.K. |
| C-2 | Ceramic Fiber Milled[*1] | Fiber flux milled fiber | " | " | 18 | " | Toshiba Monoflux K.K. |
| A-1 | Alumina Fiber Bulk[*2] | DENKA bulk | $Al_2O_3$ | $SiO_2$ | >3000 | 3.0 | Denki Kagaku Kogyo K.K. |

Notes:
G-1 to G-6: E-glass ($SiO_2$, 54% by weight; $Al_2O_3$, 14% by weight)
C-1 and C-2: Ceramics fiber ($SiO_2$, 52 wt %; $Al_2O_3$, 48 wt %)
[*1]Amorphous
[*2]Poly-crystal

TABLE 2

| EXAMPLES & COMP. EXAMPLES | FIBER REINFORCEMENTS | | | | PLATABILITY | | BENDING STRENGTH ($kgf/cm^2$) |
|---|---|---|---|---|---|---|---|
| | COMPONENT (A) | | COMPONENT (B) | | PEELING STRENGTH (kg/cm) | APPEARANCE | |
| | TYPE | WT % | TYPE | WT % | | | |
| Example 1 | G-1 | 30 | C-2 | 10 | 2.2 | ○ | 2,150 |
| Example 2 | G-2 | 30 | C-2 | 10 | 2.5 | ⊚ | 2,240 |
| Example 3 | G-4 | 30 | C-2 | 10 | 2.2 | ○ | 1,980 |
| Example 4 | C-1 | 30 | C-2 | 10 | 2.0 | ⊚ | 2,050 |
| Comp. Ex. 1 | G-3 | 30 | C-2 | 10 | 2.2 | ○ | 1,450 |
| Example 5 | G-1 | 25 | C-2 | 10 | 2.2 | ○ | 1,950 |
| Example 6 | G-1 | 20 | C-2 | 10 | 2.1 | ⊚ | 1,840 |
| Comp. Ex. 2 | G-1 | 10 | C-2 | 10 | 1.9 | ⊚ | 1,400 |
| Example 7 | G-1 | 60 | C-2 | 5 | 2.3 | ○ | 2,300 |
| Comp. Ex. 3 | G-1 | 75 | C-2 | 5 | 2.3 | X | 2,030 |
| Comp. Ex. 4 | G-1 | 30 | G-5 | 10 | 1.7 | X | 2,170 |
| Comp. Ex. 5 | G-1 | 30 | G-6 | 10 | 2.1 | X | 2,140 |
| Comp. Ex. 6 | G-1 | 30 | G-3 | 10 | 1.4 | X | 2,200 |
| Example 8 | G-2 | 30 | C-2 | 20 | 2.0 | ⊚ | 2,020 |
| Comp. Ex. 7 | g-2 | 30 | C-2 | 30 | 1.3 | ○ | 1,860 |
| Example 9 | G-2 | 30 | C-2 | 2 | 1.6 | ○ | 2,320 |
| Comp. Ex. 8 | G-2 | 30 | C-2 | 0.5 | 1.0 | X | 2,390 |
| Comp. Ex. 9 | G-1 | 30 | C-2 | — | 0.9 | Δ | 2,360 |

TABLE 2-continued

| EXAMPLES & COMP. EXAMPLES | FIBER REINFORCEMENTS | | | | PLATABILITY | | BENDING STRENGTH (kgf/cm$^2$) |
|---|---|---|---|---|---|---|---|
| | COMPONENT (A) | | COMPONENT (B) | | PEELING STRENGTH (kg/cm) | APPEARANCE | |
| | TYPE | WT % | TYPE | WT % | | | |
| Comp. Ex. 10 | A-1 | 30 | C-2 | 10 | 1.2 | c | 1,650 |

Note: The weights of the components (A) and (B) are based on the total weight of the composition.

What is claimed is:

1. A polyarylene sulfide resin composition comprising:

a polyarylene sulfide resin (A);

at least one type of a fiber reinforcement (B) containing silicic acid as a major component and having an average fiber diameter of 15 μm or shorter and an average fiber length of 300 μm or longer; and at least one type of a milled ceramic fiber reinforcement (C) containing Al$_2$O$_3$ and SiO$_2$ as major components in a ratio in weight of Al$_2$O$_3$ to SiO$_2$ ranging from 0.8 to 1 to 1.3 to 1, having an average fiber diameter of 2 to 4 μm, an average fiber length of 10 to 30 μm;

wherein the polyarylene sulfide resin (A) is contained in an amount ranging from 30% to 75% by weight, the fiber reinforcement (B) is contained in an amount ranging from 15% to 70% by weight, and the fiber reinforcement (C) is contained in an amount ranging from 1% to 25% by weight.

2. A polyarylene sulfide resin composition as claimed in claim 1, wherein the polyarylene sulfide resin (A) contains 75% by mole or greater of a repeating unit as represented by formula:

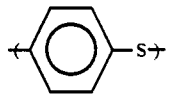

3. A polyarylene sulfide resin composition as claimed in claim 1, wherein the polyarylene sulfide resin (A) contains the repeating unit as represented by formula:

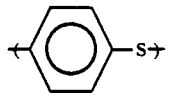

as a single repeating unit.

4. A polyarylene sulfide resin composition as claimed in claim 1, wherein the polyarylene sulfide resin (A) has a melt viscosity [300° C., 100 sec$^{-1}$] ranging from 500 to 10,000 poises.

5. A polyarylene sulfide resin composition as claimed in claim 1, wherein the fiber reinforcement (B) has an average fiber diameter of 13 μm or shorter and an average fiber length of 400 μm or longer.

6. A polyarylene sulfide resin composition as claimed in claim 1, wherein the fiber reinforcement (B) is glass fiber or ceramics fiber, each having an average fiber length ranging from 3 μm to 13 μm.

7. A polyarylene sulfide resin composition as claimed in claim 1, wherein the fiber reinforcement (C) has a ratio in weight of Al$_2$O$_3$ to SiO$_2$ ranging from 0.85 to 1 to 1.2 to 1.

8. A polyarylene sulfide resin composition as claimed in claim 1, wherein the fiber reinforcement (B) is contained in an amount ranging from 17% to 68% by weight and the fiber reinforcement (C) is contained in an amount ranging from 1.2% to 23% by weight.

9. A polyarylene sulfide resin composition as claimed in claim 1, wherein the fiber reinforcement (B) is contained in an amount ranging from 18% to 65% by weight and the fiber reinforcement (C) is contained in an amount ranging from 2% to 20% by weight.

10. A polyarylene sulfide resin composition comprising:

a polyarylene sulfide resin (A) having a melt viscosity [300° C., 100 sec$^{-1}$] ranging from 1,000 to 6,000 poises;

a fiber reinforcement (B) containing silicic acid as a major component and having an average fiber diameter ranging from 5 to 13 μm and an average fiber length of 400 μm or longer; and a fiber reinforcement (C) containing Al$_2$O$_3$ and SiO$_2$ as major components in a ratio in weight of Al$_2$O$_3$ to SiO$_2$ ranging from 0.85 to 1, to 1.2 to 1 having an average fiber diameter ranging from 2 to 4 μm and an average fiber length ranging from 10 to 30 μm;

wherein the polyarylene sulfide resin (A) is contained in an amount ranging from 35% to 70% by weight, the fiber reinforcement (B) is contained in an amount ranging from 17% to 68% by weight, and the fiber reinforcement (C) is contained in an amount ranging from 2% to 20% by weight.

11. A molded article molded from a polyarylene sulfide resin composition as claimed in claim 1.

* * * * *